(12) United States Patent
Shah et al.

(10) Patent No.: US 9,365,456 B2
(45) Date of Patent: Jun. 14, 2016

(54) HIGHLY-DISPERSED CARBON NANOTUBE-REINFORCED CEMENT-BASED MATERIALS

(75) Inventors: Surendra P. Shah, Evanston, IL (US); Maria S. Konsta-Gdoutos, Wilmette, IL (US); Zoi S. Metaxa, Evanston, IL (US)

(73) Assignee: Northwestern University, Evanston, IL (US)

( * ) Notice: Subject to any disclaimer, the term of this patent is extended or adjusted under 35 U.S.C. 154(b) by 867 days.

(21) Appl. No.: 12/322,842

(22) Filed: Feb. 6, 2009

(65) Prior Publication Data
US 2009/0229494 A1 Sep. 17, 2009

Related U.S. Application Data

(60) Provisional application No. 61/027,160, filed on Feb. 8, 2008.

(51) Int. Cl.
C04B 14/26 (2006.01)
C04B 28/02 (2006.01)
C04B 111/34 (2006.01)

(52) U.S. Cl.
CPC .............. C04B 28/02 (2013.01); *C04B 2111/34* (2013.01)

(58) Field of Classification Search
CPC ........................................................ C04B 14/26
USPC ................................................... 106/713, 724
See application file for complete search history.

(56) References Cited

U.S. PATENT DOCUMENTS

| | | | |
|---|---|---|---|
| 6,358,310 B1* | 3/2002 | Berke et al. | 106/802 |
| 7,666,327 B1* | 2/2010 | Veedu | 252/510 |
| 7,744,690 B2* | 6/2010 | Durst et al. | 106/644 |
| 2007/0031319 A1* | 2/2007 | Luthge et al. | 423/447.1 |
| 2008/0134942 A1* | 6/2008 | Brenner et al. | 106/672 |
| 2010/0221465 A1* | 9/2010 | Durst et al. | 428/34.4 |

FOREIGN PATENT DOCUMENTS

JP 2004143019 * 5/2004

OTHER PUBLICATIONS

"Atomic Force Microscopy and nanoindentation of cement pastes with nanotube dispersions", Y Saez de Ibarra et al., phys. stat. sol. (a) 203, No. 6, 1076-1081 (2006)/DOI 10.1002/pssa.200566166 p. 1076-1081.*

"Influence of carbon nanotubes and particles on reinforcment of Portland cement", Madroneero et al., Advances in Science and Technology (Faenza, Italy), 2003, 40 (Advanced Inorganic Structural Fiber Composites IV), p. 259-266. Abstract Only.*

(Continued)

*Primary Examiner* — Paul Marcantoni
(74) *Attorney, Agent, or Firm* — Bell & Manning, LLC

(57) ABSTRACT

A composite cement material is prepared from cement material and carbon nanotubes, wherein the carbon nanotubes are present from about 0.02 wt % to about 0.10 wt % based on weight of cement material. The process for preparing such cement compositions includes sonicating a mixture of a surfactant, water, and carbon nanotubes; and blending the dispersion and the cement material to form a cementitious paste. The process may also include curing the cementitious paste. The composite cement materials are useful in a variety of cement applications where a reduction in nanoscale flaws and fractures is desired.

21 Claims, 12 Drawing Sheets

(56) References Cited

OTHER PUBLICATIONS

"Augmentation of acrylic bone cement with multiwall carbon nanotubes", Marrs et al., Journal of Biomedical Materials Research, Part A (2006), 77A (2), 269-276. Abstract Only.*
CN 101531490 Gong et al. (Sep. 16, 2009) abstract only.*
"Surface decoration of carbon nanotubes and mechanical properties of cement/carbon nanotube", Cwirzen et al., Advances in Cement Research (2008), 20(2), 65-73. Abstract Only.*
"Effect of carbon nanotubes addition amount on mechanical properties of bone cement composite", Zhao et al., Shandong Huagong (2007), 36(2), 12-14, 21. Abstract Only.*
"Effect of CNTs on property of calcium phosphate cement", Zhao et al., Key Engineeering Materials (2007), 336-338 (Pt.2, High Performance Ceramics IV), 1606-1608. Abstract Only.*
RU 2287505 (Krutikov et al.) Nov. 20, 2006. Abstract Only.*
CN 1559887 (Sun et al.) Jan. 5, 2005. Abstract only.*
"Carbon based nanostructure in a modern inorganic material", Kowald et al., GDCh-Monographie (2004), 31 (Tagung Bauchemie, 2004), 162-165. Abstract Only.*
"Nano-reinforced Composite Material", Krutikov et al. Izhevsk. Gos. Tekh. Univ. Izhevsk, 426069, Russia; ISJAEE (2005), (4), p. 36-41. Abstract Only.*
RU 2233254 (Ponomarev et al.), Jul. 27, 2004. Abstract Only.*
WO 2003101908 (Ponomarev et al.) Dec. 11, 2003. Abstract only.*
"Atomic force microscopy and nanoindentation of cement pastes with nanotube disperions", (Saez de Ibarra et al.), Physica Status Solidi A: Applications and Materials Science (2006), 203(6), 1076-1081. Abstract.*
"Carbon nanotubes as a new reinforcement material for modern cement based binders", RILEM Proceedings (2005), PRO 45 (2nd Int'l Symposium on Nanotechnology in Construction) (NICOM2), 2005), 209-213. Abstract.*
JP 2004143019 (Morita et al.) May 20, 2004. abstract only.*
JP 2004143019 Machiine Translation into English (May 20, 2004) Morita et al.*
"Mechanical and stress-sensitive properties of multi-walled carbon naontubes reinforced cement matrix composites", Luo et al., World Forum on Smart Materials and Smart Technology, Nanjing China May 22-27, 2007 (2008) Meeting Date 2007., 289/1-289/5. abstract only.*
"Flexural Strengths and characteristics of cement based composite reinforced with acid-treated multiwalled carbon nanotubes", Luo Jingxi Huagong (2008), 25(10), 940-944. abstract only.*
"Dispersion effect of diversified surfactants on mulitwalled carbon naontube in aqueous solution", Luo et al., Jingxi Huagong (2008), 25(8), 733-738. abstract only.*
SEM/AFM SUtidies of cementitious binder modified by MWCNT and nanosized Fe Needles, Cwirzen et al., Materials Characterization (2009), 60(7), 735-740. abstract only.*
Y. Akkaya, et al., Influence of Fiber Dispersion on the Performance of Microfiber Reinforced Cement Composites, ACI SP-216-1, 2002, 216, pp. 1-26.
T. Belyschko, et al., Atomistic simulations of nanotube fracture, Physical Review B, 2002, 65, pp. 235430-235438.
J. Björnström and S. Chandra, Effect of superplasticizers on the rheological properties of cements, Materials and Structures, 2003, 36, pp. 685-692.
Georgios Constantinides and Franz-Josef Ulm, The nanogranular nature of C—S—H, Journal of the Mechanics and Physics of Solids, 2007, 55, pp. 64-90.
Burak Felekoğlu and Hasan Sarikahya, Effect of chemical structure of polycarboxylate-based superplasticizers on workability retention of self-compacting concrete, Construction and Building Materials, 2008, 22, pp. 1972-1980.
Nicole Grobert, Carbon nanotubes—becoming clean, Materials Today, 2007, 10, pp. 28-35.
Sumio Iijima, Helical microtubules of graphitic carbon, Nature, 1991, 354, pp. 56-58.

Junrong Yu, et al., Controlling the dispersion of multi-wall carbon nanotubes in aqueous surfactant solution, Carbon, 2007, 45, pp. 618-623.
M.S. Konsta-Gdoutos, et al., Relationships between Engineering Characteristics and Material Properties of High Strength—High Performance Concrete, International Symposia Celebrating Concrete, Dundee, Scotland, 2003.
Geng Ying Li, et al., Mechanical behavior and microstructure of cement composites incorporating surface-treated multi-walled carbon nanotubes, Carbon, 2005, 43, pp. 1239-1245.
Geng Ying Li, et al., Pressure-sensitive properties and microstructure of carbon nanotube reinforced cement composites, Cement & Concrete Composites, 2007, 29, pp. 377-382.
J.M. Makar and J.J. Beaudoin, Carbon nanotubes and their application in the construction industry, Proceedings of the 1st International Symposium on Nanotechnology in Construction, Royal Society of Chemistry, 2003, pp. 331-341.
J.M. Makar, et al., Carbon nanotube/cement composites-early results and potential applications, Proceedings of the 3rd International Conference on Construction Materials, Performance, Innovations and Structural Implications, Vancouver, B.C., Canada, 2005,1-10.
Paraita Mondal, et al., Nanoscale Characterization of Cementitious Materials, ACI Materials Journal, 2008, 105, pp. 174-179.
Jiří Němeček, et al., Nanoindentation Size Effect of Cement Pastes, Proceedings of the 2nd International Symposium in Nanotechnology, RILEM Publications SARL, 2006, pp. 161-168.
W.C. Oliver and G.M. Pharr, An improved technique for determining hardness and elastic modulus using load and displacement sensing indentation experiments, J. Mater. Res., 1992, 7, pp. 1564-1583.
G. Rouainia, et al., Evaluation of Young's Modulus of Single Walled Carbon Nanotube(SWNT) Reinforced Concrete Composite, J. Eng. & Appl. Sci., 2008, pp. 504-515.
Y. Sáez de Ibarra, et al., Atomic force microscopy and nanoindentation of cement pastes with nanotube dispersions, Physica Status Solidi(a), 2006, 203, pp. 1076-1081.
J.-P. Salvetat, et al., Mechanical properties of carbon nanotubes, Appl. Phys. A, 1995, 69, pp. 255-260.
S. Wansom, et al., AC-impedance response of multi-walled carbon nanotube/cement composites, Cement & Concrete Composites, 2006, 28, pp. 509-519.
Xiao-Lin Xie, et al., Dispersion and alignment of carbon nanotubes in polymer matrix: A review, Materials Science and Engineering R., 2005, 49, pp. 89-112.
Kazuo Yamada, et al., Effects of the chemical structure on the properties of polycarboxylate-type superplasticizer, Cement and Concrete Research, 2000, 30, pp. 197-207.
Ying Yang, et al., Thermal and rheological properties of carbon nanotube-in-oil dispersions, Journal of Applied Physics, 2006, 99, pp. 114307.
Yakovlev et al., Cement Based Foam Concrete Reinforced by Carbon Nanotubes, Materials Science, vol. 12, No. 2, 2006, pp. 147-151.
Mitchell et al., The Effects of Solvents on C—S—H as Determined by Thermal Analysis, Journal of Thermal Analysis and Calorimetry, vol. 86, No. 3, Dec. 2006, pp. 591-594.
Al-Rub et al., On the aspect ratio effect of multi-walled carbon nanotube reinforcements on the mechanical properties of cementitious nanocomposites, Construction and Building Materials, vol. 35, May 31, 2012, pp. 647-655.
Hunashyal et al., Experimental investigation of the effect of carbon nanotubes and carbon fibres on the behaviour of plain cement composite beams, The IES Journal Part A: Civil & Structural Engineering, vol. 4, No. 1, Feb. 10, 2011, pp. 29-36.
Campillo et al., High-Performance Nanostructured Materials for Construction, Nanotechnology in Construction, 2004, pp. 215-225.
Jiang et al., Carbon Nanotubes as a New Reinforcement Material for Modern Cement-Based Binders, NICOM 2: $2^{nd}$ International Symposium on Nanotechnology in Construction, 2006, pp. 209-213.
Luo et al., The influence of surfactants on the processing of multi-walled carbon nanotubes in reinforced cement matrix composites, Phys. Status Solidi A, vol. 206, No. 12, Jul. 27, 2009, pp. 2783-2790.
Ferro et al., Carbon nanotubes cement composites, Frattura ed Integrità Strutturale, vol. 18, 2011, pp. 34-44.

(56) References Cited

OTHER PUBLICATIONS

Sobolkina et al., Dispersion of carbon nanotubes and its influence on the mechanical properties of the cement matrix, Cement & Concrete Composites, vol. 34, Aug. 8, 2012, pp. 1104-1113.

Pacheco-Torgal, Nanotechnology: Advantages and drawbacks in the field of construction and building materials, Construction and Building Materials, vol. 25, Aug. 1, 2010, pp. 582-590.

Knapen et al., Effect of free water removal from early-age hydrated cement pastes on thermal analysis, Construction and Building Materials, vol. 23, No. 11, Nov. 2009, pp. 3431-3438.

Han et al., Multifunctional and Smart Carbon Nanotube Reinforced Cement-Based Materials, Chapter 1 from *Nanotechnology in Civil Infrastructure—A Paradigm Shift*, Kasthurirangan Gopalakrishnan, Bjorn Birgisson, Peter Taylor, and Nii O. Attoh-Okine (Eds.), Springer, 2011, pp. 1-47.

Selvam et al., Application of Nanoscience Modeling to Understand the Atomic Structure of C—S—H, Chapter 3 from *Nanotechnology in Civil Infrastructure—A Paradigm Shift*, Kasthurirangan Gopalakrishnan, Bjorn Birgisson, Peter Taylor, and Nii O. Attoh-Okine (Eds.), Springer, 2011, pp. 85-102.

Birgisson et al., Optimization of Clay Addition for the Enhancement of Pozzolanic Reaction in Nano-modified Cement Paste, Chapter 7 from *Nanotechnology in Civil Infrastructure—A Paradigm Shift*, Kasthurirangan Gopalakrishnan, Bjorn Birgisson, Peter Taylor, and Nii O. Attoh-Okine (Eds.), Springer, 2011, pp. 225-236.

Sanchez et al., Nanotechnology in concrete—A review, Construction and Building Materials, vol. 24, May 15, 2010, pp. 2060-2071.

Melo et al., Macro- and Micro-Characterization of Mortars Produced with Carbon Nanotubes, ACI Materials Journal, vol. 108, No. 3, May-Jun. 2011, pp. 327-332.

Chen et al., Carbon nanotube-cement composites: A retrospect, The IES Journal Part A: Civil & Structural Engineering, vol. 4, No. 4, Sep. 19, 2011, pp. 254-265.

\* cited by examiner

HIGHLY-DISPERSED CARBON NANOTUBE-REINFORCED CEMENT-BASED MATERIALS

RELATED APPLICATION

This application claims benefits and priority of provisional application Ser. No. 61/027,160 filed Feb. 8, 2008, the disclosure of which is incorporated herein by reference.

GOVERNMENT RIGHTS

The invention was made in part with government support under Grant DTRT06-G-0015/M1 awarded by the Infrastructure Technology Institute (Department of Transportation). The Government has certain rights in the invention.

FIELD OF THE INVENTION

The present invention relates to reinforcement of cement-based materials and, more specifically, the invention relates to methods of producing highly dispersed carbon nanotubes (CNTs) reinforced cement based nanocomposite materials as well as the CNT-cement nanocomposite materials.

BACKGROUND OF THE INVENTION

A significant portion of the current civil infrastructure is partially or completely constructed of cementitious materials, such as concrete. Cementitious materials are typically characterized as quasi-brittle materials with low tensile strength and low strain capacity. Fibers can be incorporated into cementitious matrices to overcome these weaknesses. Typical reinforcement of concrete is provided using reinforcing bars and macrofibers, both of which reinforce concrete on the millimeter scale. Recently, the use of microfiber reinforcement has led to significant improvement of the mechanical properties of cement based materials (Akkaya et al., ACI SP-216-1 2003, 216, 1-18). However, while microfibers delay the development of formed microcracks, they do not stop their initiation. The development of new nanosized fibers has opened a new field for nanosized reinforcement within concrete. The incorporation of fibers at the nanoscale according to the invention will allow the control of the matrix cracks at the nanoscale level and essentially create a new generation of a "crack free material".

One of the most advantageous nanomaterials for nano-reinforcement are carbon nanotubes (CNTs). Since their discovery from Iijima (Iijima, Nature 1991, 354, 56-58), CNTs have opened an incredible range of applications in materials science, electronics, chemical processing, energy management, and many other fields. A CNT can be thought of as a sheet or sheets of graphite that have been rolled up into a tube structure. CNTs can be single walled nanotubes (SWCNTs), as if a single sheet had been rolled up with diameter close to 1 nm, or multiwalled (MWCNTs), similar in appearance to a number of sheets rolled together with diameter ranges from 10-80 nm. The unique mechanical, electrical and chemical properties of CNTs make them an attractive candidate for the next generation of composite materials. The Young's modulus of an individual nanotube should be around 1 TPa and its density is about 1.33 $g/cm^3$ (Salvetat et al., Appl. Phys. A 1995, 69, 255-260). Compared to steel, CNTs possess five to ten times greater modulus than steel at just one sixth the weight. Molecular mechanics simulations suggested that CNTs fracture strains were between 10% and 15%, with corresponding tensile stresses on the order of 65 to 93 GPa (Belytschko et al., Phys. Rev. B 20052 65, 235430-235437). The aspect ratios of CNTs are generally beyond 1000.

Carbon nanotubes are expected to have several distinct advantages as a reinforcing material for cement as compared to more traditional fibers. First, they have significant greater strengths than conventional fibers, which strengths should improve overall mechanical behavior. Second, they exhibit higher aspect ratios, requiring significantly higher energies for crack propagation than would be the case for a lower aspect ratio fiber. Thirdly, CNTs exhibit smaller diameters which means that, provided that they are uniformly dispersed according to the invention, they can be widely distributed in the cement matrix with reduced fiber spacing. As illustrated by Akkaya et al. (ACI SP-216-1 2003, 216, 1-18), the tensile strength of the composite is increased when the fiber free area is decreased.

However, the potential of using nanotubes as reinforcement for cementitious materials has not been fully realized heretofore mainly because of the difficulties in processing. The two major drawbacks associated with the incorporation of CNTs in cement based materials are poor dispersion and cost. CNTs tend to adhere together due to Van der Waal forces, and it is particularly difficult to separate them individually (Groert, Materials Today 2007, 10, 28-35). To achieve good reinforcement in a composite, it is critical to have uniform dispersion of CNTs within the matrix. Poor dispersion of CNTs leads to the formation of many defect sites in the nanocomposite and limits the efficiency of the CNTs in the matrix (Xie et al., Mater. Sci. Eng. Rep. 2005, 49, 89-112).

Earlier attempts have been made to add CNTs in cementitious matrices at an amount ranging from 0.5 to 2.0 wt % (by weight of cement). Prior work on CNTs in liquid dispersions has focused on pre-treatment of the nanotube's surface via chemical modification. Makar et al. (Makar and Beaudoin, Proceedings of the 1st International Symposium on Nanotechnology in Construction, Royal Society of Chemistry 2004, 331-341; Makar et al., Proceedings of the 3rd International Conference on Construction Materials: Performance, Innovations and Structural Implications, Vancouver, B.C., Canada 2005, 1-10) reported an ethanol/sonication technique for dispersing 2.0 wt % CNTs in cement. The results obtained from SEM and Vickers hardness measurements indicate that CNTs affect the early hydration progress, producing higher hydration rates. Li et al. (Carbon 2005, 43, 1239-1245; Cem. Concr. Comp. 2007, 29, 377-382) employed a carboxylation procedure to improve the bonding between 0.5 wt % MWCNTs and cement matrix and obtained modest improvements in compressive and flexural strength. Saez de Ibarra et al. (Physica Status Solidi (a) 2006, 203, 1076-1081) used gum Arabic as a dispersing agent and reported modest gains in compressive strength and Young's modulus. Wansom et al. (Cem. Concr. Comp. 2006, 28 509-519) investigated the electrical properties of CNT-cement nanocomposites using a polycarboxylate based superplasticizer and methylcellulose with 0.75 and 0.1 vol % of CNTs. However, despite the efforts to date, only marginal success for nanotube reinforced cement based materials has been realized, mainly because of the above mentioned barrier to dispersion.

SUMMARY OF THE INVENTION

The present invention provides a solution to the above-stated dispersion and cost problems by providing improved dispersion of small amounts of carbon nanotubes in cement based materials. In an embodiment of the invention, the method involves applying ultrasonic energy and use of a surfactant to provide a CNT fluid (e.g. aqueous) dispersion and mixing the CNT dispersion with a cement material in a manner that the CNTs are well dispersed in the cementitious matrix. As a result of effective dispersion, the fracture properties and other properties such as the transport properties of the cementitious matrix are substantially increased by adding a very low, less costly amount of CNTs. The addition of a small quantity of CNTs enables the control of the matrix cracks at the nanoscale level. In addition the use of CNTs at a very low percentage makes the cost of the cement composition pursuant to the invention very attractive. In an illustrative embodiment of the invention, the CNT's are present in an amount from about 0.02% to about 0.10%, preferably about 0.03% to about 0.10%, by weight of cement.

The nanocomposite cementitious material pursuant to the invention will have a beneficial impact on economics, environment, and structural durability, which is extremely important to the overall public view. The potential benefits of infrastructure having such a new type of composite material include the following:

Enhance the quality of cement and improve material durability by delaying the crack formation and increase the likelihood of multiple cracking.

Reduce the maintenance construction cost.

Develop a high performance and durable repair material which will produce durable, aesthetically pleasing and cost-effective repairs.

The CNT-cement nanocomposite material pursuant to the invention will find wide application for highway structures, bridges, pavements, runways for airports, continuous slab-type sleepers for high speed trains and in general in all applications of conventional and high strength concrete, as well as in manufactured precast elements for residential and commercial buildings.

The method of the invention is particularly useful and beneficial to overcome the major obstacle to the manipulation and use of carbon nanotubes for reinforcement in cementitious materials has been their poor dispersion. Typical dispersing techniques of CNTs such as dispersion with sodium dodecyl sulfate or dispersion using different types of acids (Xie et al., Mater. Sci. Eng. Rep. 2005, 49, 89-112) can not be employed for cementitious materials due to the nature of the matrix.

Other advantages of the present invention will become more readily apparent from the following detailed description taken with the following drawings.

DETAILED DESCRIPTION OF THE INVENTION

Figure 1:
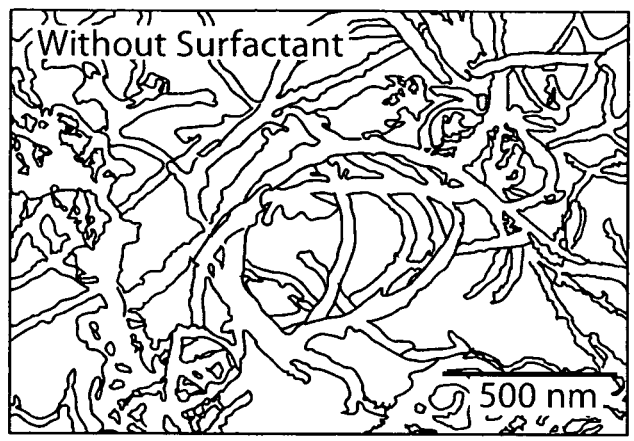
FIGS. 1($a$) and 1($b$) depict SEM images of fracture surfaces of cement paste reinforced with CNTs dispersed without (FIG. 1($a$)) and with (FIG. 1($b$)) the use of surfactant. The surfactant used was Glenium 3030. Details about the surfactant are given in Table 5.

The present invention is directed to a method of producing highly dispersed carbon nanotubes (CNTs) reinforced cement-based composite materials by applying ultrasonic energy and using a surfactant to form a fluid dispersion of CNTs and mixing the dispersion and a cement material in a manner that CNTs can be well dispersed in the cementitious matrix. As a result of effective dispersion the fracture and other properties of the cement matrix were substantially increased by adding a very small amount of CNTs. In an illustrative embodiment of the invention, the CNT's are present in an amount from about 0.02% to about 0.10%, preferably about 0.03% to about 0.10%, by weight of cement. The addition of this small quantity of CNTs enables the control of the matrix cracks at nanoscale level. In addition the use of CNTs at this very low percentage makes the cost of the material very attractive.

In an embodiment of the invention, the method comprises the steps of: 1) adding CNTs into aqueous-surfactant solution; 2) dispersing CNTs into the solution through sonication; 3) mixing the sonicated suspension (dispersion) with cement material to form a cement paste; and 4) curing the cement paste samples to form a CNTs-cement composite material wherein the CNTs are dispersed in the cement matrix.

Carbon nanotubes are an allotrope of carbon. They essentially resemble sheets of graphite rolled into tubes, the diameter of which is on the nanometer scale, but the length of which can vary widely from the nanometer scale to several millimeters. Carbon nanotubes, useful in practice of the present invention, include but not limited to multi-wall carbon nanotubes where the tubes are formed of concentric tubes of varying diameter (i.e. a tube-in-a-tube). Carbon nanotubes are commercially available and may be produced by a variety of methods. Methods of CNTs synthesis include, but not limited to, chemical vapor deposition (CVD), arc discharge, laser vaporization and HiPCo (high pressure carbon monoxide) process.

Cement is ubiquitous in the building arts, but for the purposes of this specification is defined as a fine, soft, dry, powdery-type substance, comprising elements such as limestone, clay, sand, and/or shale, among others, that when mixed with water, can cure into a hard, solid mass.

Portland cement is one such exemplary cement material. Portland cement is defined by ASTM C 150 as a "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." Clinkers are nodules (diameters, 0.2-1.0 inch [5-25 mm]) of a sintered material that is produced when a raw mixture of predetermined composition is heated to high temperature. Different types of Portland cement are manufactured to meet different physical and chemical requirements for specific purposes, such as durability and high-early strength. Other exemplary cement material for use in practice of the invention includes, but is not limited to hydraulic cement that optionally can include one or more additives comprised of natural volcanic pozzolan, artificial pozzolan, granulated blast furnace slag, fly ash, silica fume, limestone and/or calcined shale for purposes of illustration and not limitation.

Figure 1B:
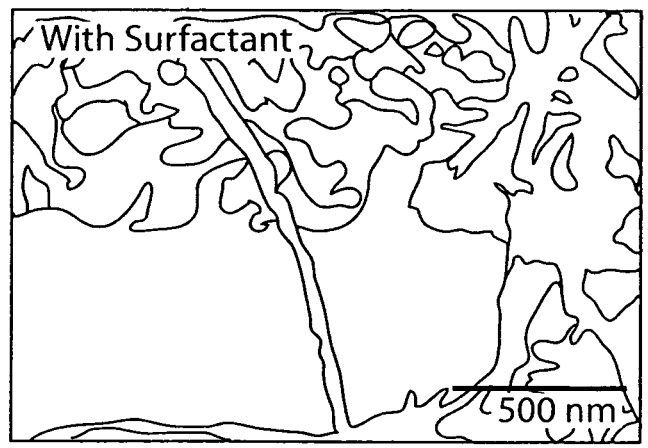

In practice of the method of the invention, surfactants are added to the CNT aqueous solutions to aid the dispersion of the CNTs throughout the cement matrix. Suitable surfactants include, but are not limited to, polycarboxylate-based superplasticizers which are commercially available admixtures sold under tradenames such as Glenium 3030, PS 1466, ADVA 360, ADVA Cast 555. Without being bound by theory, the surfactant aids in controlling flocculation by a dispersing mechanism known as steric hindrance; the oriented adsorption of a non-ionic polymer can weaken the attraction between solid particles. FIGS. 1(a) and 1(b) show scanning electron microscope (SEM) images of cement paste nanocomposites reinforced with CNTs that were dispersed with and without the use of surfactant. The surfactant used for dispersing the CNTs was Glenium 3030. It is observed that in samples where dispersion was achieved without the use of surfactant [FIG. 1(a)], CNTs appear poorly dispersed in cement paste, forming large agglomerates and bundles. In the case where dispersion was achieved with the use of surfactant [FIG. 1(b)], only individual CNTs were identified on the fracture surface.

The use of superplasticizers is quite common in cement based materials such as concrete. The main purpose of using superplasticizers is to produce flowing concrete with very high slump to be used in heavily reinforced structures and in placements where adequate consolidation by vibration cannot be readily achieved. The other major application of superplasticizers is the production of high-strength concrete with normal workability but lower water content.

Figure 2:
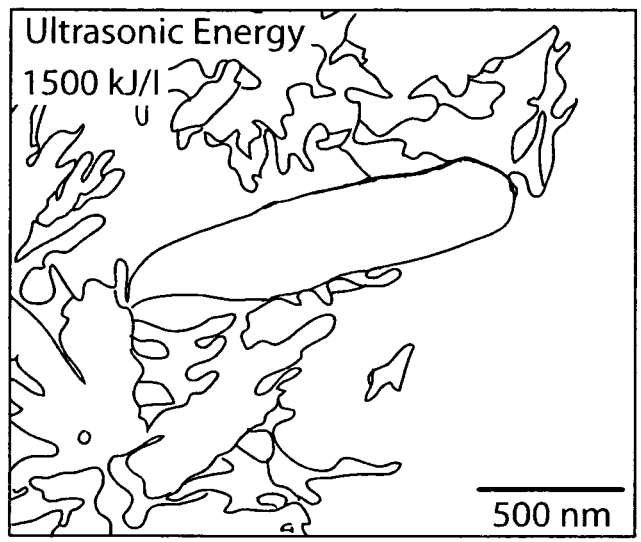
FIGS. 2($a$) and 2($b$) depict SEM images of fracture surfaces of cement paste reinforced with CNTs dispersed via sonication at an ultrasonic energy of FIG. 2($a$) 1500 kJ/l and FIG. 2($b$) 2800 kJ/l (kiloJoules/liter).
Figure 2:
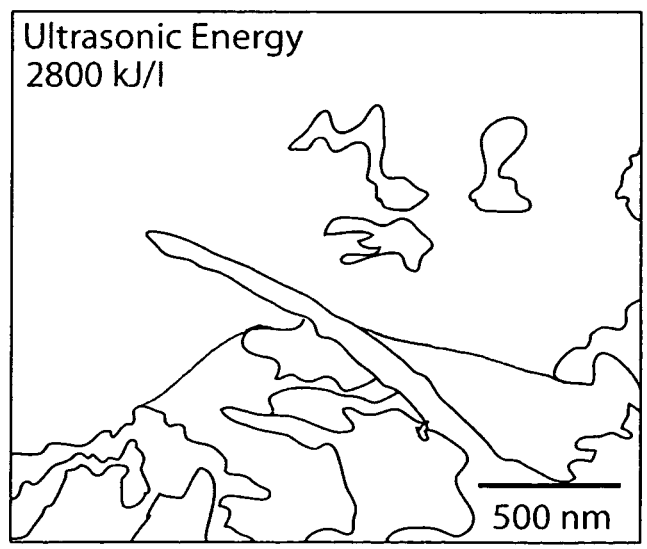

Pursuant to an embodiment of the invention, ultrasonic energy is used to disperse CNTs in aqueous surfactant solutions. The resulting dispersions are then mixed with cementitious matrices during mixing and prior to curing of the cement. FIGS. 2(a) and 2(b) show SEM images of two of the prepared samples. From the images, it is observed that for the CNT-cement composites containing CNT dispersions with 0.5% by weight of cement surfactant sonicated at an ultrasonic energy of 1500 kJ/l [FIG. 2(a)], the CNTs remain in the cement paste matrix mainly in bundles with a mean diameter of about 250 nm. The application of higher sonication energy (2800 kJ/l) [FIG. 2(b)], resulted in a maximum effective dispersion and individual nanotubes can clearly be observed in the cement matrix.

The methods of the present invention lead to the dispersion of CNTs in the cement matrix. In an illustrative embodiment of the present invention, effective dispersion of CNTs is achieved by defining the optimum weight ratio of surfactant to CNTs using the minimum ultrasonic energy required. For purposes of illustration and not limitation, an embodiment of the invention employs a surfactant to carbon nanotubes weight ratio of about 1.5 to about 8.0 (wherein the surfactant weight is the weight of the surfactant in the solution), and sonication of the solution is conducted using an ultrasonic energy of about 700 to about 4200 kJ/l.

Figure 3:
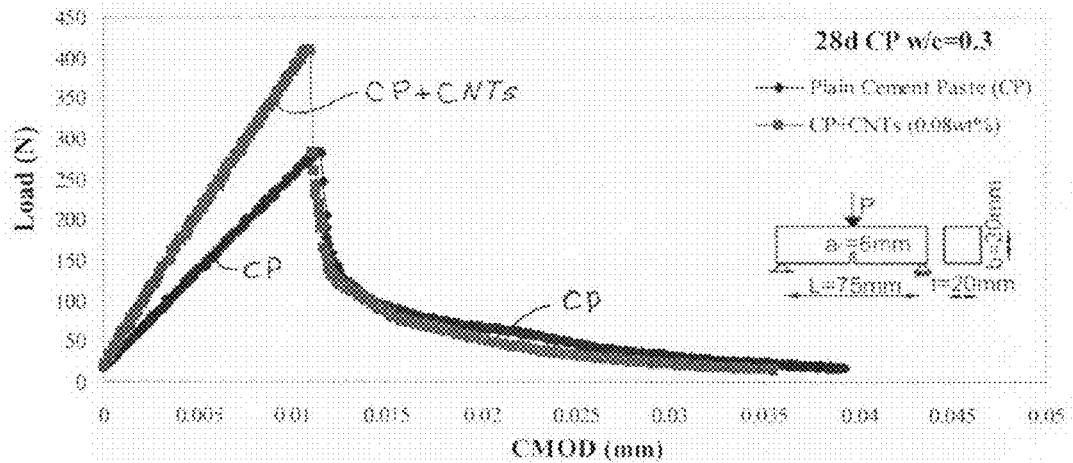
FIG. 3 is a graph illustrating the 28 day flexural strength of plain cement paste and cement paste reinforced with 0.08 wt % CNTs at a water to cement ratio of 0.3.

Effective dispersion of CNTs in cement matrices increases the fracture resistance properties as shown by the graph in FIG. 3. The increase in the fracture resistance may be accomplished via the use of small amounts of CNTs in the cement composition. The amount of CNT added may range from about 0.03 wt % to about 0.10 wt % in some particular embodiments; from about 0.04 wt % to about 0.08 wt % in other particular embodiments, wherein the weight percents are based on the weight of the cement with which the dispersion is mixed. Additionally, the nanoindentation results suggest that the use of small amounts of CNTs can strongly reinforce the cement paste matrix at the nanoscale by increasing the amount of high stiffness C-S-H and decreasing the porosity which leads to the reduction of the autogenous shrinkage. The autogenous shrinkage results indicate that CNTs, except of the reinforcement effect, can also have beneficial effect on other properties such as the transport properties of cementitious materials which leads to the improvement of the durability of the cementitious matrix. Surprisingly, the addition of such small, well-dispersed amounts of CNTs, controls the formation of matrix cracks at the nanoscale level.

In an illustrative embodiment of the invention, the method prepares the CNT-dispersion by mixing water, surfactant and the CNTs together using sonication. This mixture (CNT dispersion) is then blended with the cement according to the procedure outlined by ASTM 305 to form a cementitious paste. Water can be added, apart from the CNT dispersion, in order to achieve different water to cement ratios. In accordance with the ASTM 305 protocol, the mixture (CNT dispersion) is added to cement or the cement is added to the mixture and it is allowed to rest for 30 s for the absorption of the water. Then mixing is applied at low speed (140±r/min) for 30 s after which the mixing is ceased and any paste that may have collected on the sides of the bowl is scraped down into the batch within a 15 s interval. Then mixing is continued for 60 s at medium speed (285±10 r/min). Following mixing, the resultant cement paste may be cast in molds or used in applications known to those of skill in the art, and cured.

Curing may be accomplished by allowing the cement paste specimens to moist cure over time, at 23±2° C. as is known to those of skill in the art. Alternatively moist curing may be accomplished in water saturated with lime or in moist cabinets at a relative humidity of not less than 95%.

The use of CNTs, at the very low percentages described herein, provides for reinforcement of cured cements and structures at the nanoscale level, and reduces production costs to a level that is commercially acceptable. Such CNT-reinforced, cement-based materials may find wide applications for use in highway structures, bridges, pavements, and in various other conventional and high-strength concrete, as well as in manufactured pre-cast elements for residential and commercial buildings.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The present invention, thus generally described, will be understood more readily by reference to the following examples, which are provided by way of illustration and are not intended to be limiting of the present invention.

EXAMPLES

Introduction

For all the examples, two types of purified MWCNTs were used having the same outer diameter, but different lengths. The length of each type of CNT was in the range of 10-30 μm and 10-100 μm, for short and long CNTs, respectively. Short CNTs were provided by Cheap Tubes of Brattleboro, Vt. and long CNTs were provided by Nanothinx of Rio Patras, Greece, CNTs were used untreated as-received. MWCNTs were produced by catalytic chemical vapor deposition of carbon (CCVD) from hydrocarbon feeds using metallic catalysts on suitable supports. The materials were used as received. Several properties of the MWCNTs used in the exemplary compositions are shown in Table 1. The cementitious material used was ordinary Portland cement (OPC). For the preparation of MWCNTs dispersions, a surfactant was used. The surfactants were comprised of Glenium 3030, Adva 360, Adva Cast 555 and PS 1466. The dispersion compositions are set forth below in Examples 1 to 5.

TABLE 1

Properties of MWCNTs

| Company Name | Production Method | Diameter (nm) | Length (μm) | Purity (%) | Surface area ($m^2/g$) | Density ($g/cm^3$) | Aspect Ratio |
|---|---|---|---|---|---|---|---|
| Cheap Tubes | CVD | 20-40 | 10-30 | >90 | 110 | 2.1 | 667 |
| Nanothinx | CVD | 20-40 | 10-100 | >97 | 250-300 | 2.6 | 1667 |

In a typical procedure, CNT suspensions were prepared by adding the MWCNTs in an aqueous surfactant solution. The resulting dispersions were sonicated at room temperature. Constant energy was applied to the samples using a 500 W cup-horn high intensity ultrasonic processor provided by Sonics & Materials Inc. (model VCX500) with a cylindrical tip of 13 mm end cap diameter and temperature controller. The sonicator was operated at an amplitude of 50% so as to deliver an energy of 1900-2100 J/min at cycles of 20 s so as to prevent overheating of the dispersions. The high temperature limit was set at 60° C.

After sonication, OPC cement was added to the CNT dispersions at a water to cement ratio (w/c) of 0.5 or 0.3. The components were then mixed according to the procedure outlined by ASTM 305 using a standard Hobart mixer. Following mixing, the resultant paste was cast in 20×20×80 mm molds. After demoulding the samples were cured in water saturated with lime, until testing.

Characterization

The influence of CNT dispersion on the rheological properties of cement paste samples was investigated. The rheological characteristics of the samples with the sonicated dispersions were measured using a Haake Rheostress 150 rheometer with a 20 mm concentric cylinder measurement system. A steady stress protocol similar to the one proposed by Yang et al. (Yang et al., J. Appl. Phys. 2006, 99, 114307) was applied to determine the viscosity dependence on stress. Cement paste was placed in the rheometer immediately after mixing. Each sample was presheared at 100 $s^{-1}$ for 200 s, and then allowed to rest for 200 s. A low stress of 4.5 Pa was applied to the sample, and the stress was increased stepwise. Initial stresses were chosen to be higher than the yield stress of the material. The samples were held at each stress condition for 40 s. The holding time was necessary to ensure that an equilibrium flow had been reached. Apparent viscosity (η) as well as shear rate (γ') as a function of time was monitored and recorded during the test. The viscosity at each shear stress was obtained by averaging the values in the last 10 seconds that corresponded to the equilibrium region.

The morphology and the microstructure of the fracture surface of CNT reinforced nanocomposites were examined using two different types of ultra-high resolution field emission scanning electron microscopes (Hitachi S5500 and LEO Gemini 1525) operated at 3 to 5 kV. Secondary electron (SE) imaging was employed to obtain clear images at medium to high magnifications (10,000× to 150,000×). Specimens of 25.4×6.35×6.35 mm were prepared for each mix. After 18 hours of curing, specimens were demoulded and kept in acetone to stop the hydration. Prior to their observation, the fracture surface of the specimens was sputter-coated using the Denton Desk III system. Due to the roughness of the surface, a 20 nm thick layer of gold-palladium (Au/Pd) was used to eliminate charging effects caused by insufficient coating.

The mechanical performance of the CNT composites was evaluated by fracture mechanics tests which provide more consistent results compared to the results of the bending test. Beam specimens of 20×20×80 mm were tested by three-point bending at the age of 3, 7 and 28 days. Three replications were made for each nanocomposite tested. Before testing, a 6 mm notch was introduced to the specimens using a water-cooled diamond saw. The test was performed using an 89 kN, MTS servo-hydraulic, closed-loop testing machine. A clip gauge was used to measure the crack mouth opening displacement (CMOD). The CMOD was used as a feedback to produce a stable fracture at a rate of 0.012 mm/min and 0.009 mm/min for samples with water to cement ratio of 0.5 and 0.3, respectively. The load and the CMOD were recorded during the test. The Young's modulus was calculated from the load versus CMOD results using the two-parameter fracture model by Jenq and Shah (Shah et al., John Wiley and Sons 1995, New York).

The nanomechanical properties of the CNT composites were investigated using a triboindenter. The triboindenter is a special type of nanoindenter that combines nanoindentation to determine the local properties of the material at the nanoscale, with high-resolution in-situ scanning probe microscopy (SPM) imaging that allows pre- and post-test observation of the sample. A Berkovich tip with a total included angle of 142.3 degrees was used for indentation and SPM imaging. Multiple cycles of partial loading and unloading were used to make each indention, eliminating creep and size effects (Nemecek et al., Proceeding of the 2nd International Symposium in Nanotechnology, RILEM Publications SARL, 2006, 161-168). The Oliver and Pharr method was used to determine the mechanical properties, where the indentation modulus is calculated from the final unloading curve (Oliver and Pharr, J. Mater. Res. 1992, 7, 1564-1583). Prismatic specimens of 25.4×6.35×6.35 mm were prepared and cured in water saturated with lime for 28 days. After curing, specimens were kept in acetone. Before testing, thin sections of approximately 5 mm were cut out of the specimens and mounted using an adhesive (softening temperature 71° C.) on a metal sample holder for polishing. Polishing is very important for nanoindentation. Eliminating the sample roughness without any damage is necessary for the determination of reliable local mechanical properties (Mondal et al., ACI Mater. J. 2008, 105, 174-179). Samples were polished using silicon carbide paper discs of gradation 22 µm, 14 µm, 8 µm and 5 µm and diamond lapping films of gradation 6 nm and 3 nm. Water was used in the first two and last two gradations. At every step an optical microscope was used to check the effectiveness of the polishing. As a final step the polished samples were ultrasonically cleaned in water for 1 minute using a bath sonicator to remove polishing debris. An environmental scanning electron microscope (ESEM) at low vacuum mode was used to further investigate the effectiveness of the polishing procedure and find representative areas of the samples. Before nanoindentation, representative areas of the nanocomposites were also imaged using the Berkovich tip of the triboindenter to provide surface information at millimeter to nanometer scale. Nanoindentation was performed in a 12×12 grid (10 µm between adjacent grid points). This procedure was repeated in at least two different areas on each sample.

The autogenous shrinkage of cement nanocomposites was studied using a modified version of ASTM C 341 and ASTM C 490. Cement paste specimens of 20×20×80 mm were cast following the procedure described above. Immediately after setting (~6 hours after casting) specimens were demoulded and sealed using plastic wrap. Stainless steel gage studs were glued directly to the surface of the specimens using a five minutes epoxy resin maintaining a 50.8 mm gage length. A length comparator was used to measure the autogenous shrinkage from the time of final setting up to 96 hours after casting.

Example 1

Ultrasonic Energy Requirement

This Example serves to illustrate whether the use of ultrasonic energy is required in order to achieve effective dispersion. The effect of ultrasonic energy on the dispersion of the CNTs was investigated measuring the rheological properties of cement paste samples reinforced with MWCNTs under steady shear stress. Rheology is a method commonly used to study the microstructure of nanotube dispersions. Under low shear stress, CNT agglomerates control the viscosity of cement nanotube suspensions. Therefore, suspensions with larger scale agglomerates exhibit higher viscosity (Yang et al., J. Appl. Phys. 2006, 99, 114307).

Materials

Long MWCNTs were used. The surfactant used was a full range water reducing admixture (superplasticizer) based on polycarboxylate chemistry (Glenium 3030) produced by BASF.

Samples Preparation

Six dispersions were prepared by mixing the MWCNT (0.16 g) with aqueous surfactant solutions (100 g) at surfactant to CNTs weight ratios of 0, 1.5, 4.0, 5.0, 6.25 and 8.0. The mix proportions for the sonicated suspensions are shown in Table 2. The resulting dispersions were sonicated at room temperature at an energy of 2800 kJ/l following the procedure described previously. Then the dispersions were mixed with cement at a water to cement ratio of 0.5 (w/c=0.5) and the rheological properties of the cementitious composite samples were investigated. The mix proportions by weight of cement are shown in Table 3.

TABLE 2

Proportions for Sonicated Suspensions

| | | | | | | | |
|---|---|---|---|---|---|---|---|
| Water (wt %) | 99.84 | 99.60 | 99.36 | 99.21 | 99.05 | 98.85 | 98.58 |
| Surfactant (SFC) (wt %) | 0.00 | 0.24 | 0.48 | 0.63 | 0.79 | 0.99 | 1.26 |
| MWCNTs (wt %) | 0.16 | 0.16 | 0.16 | 0.16 | 0.16 | 0.16 | 0.16 |
| SFC/CNTs | 0 | 1.5 | 3.0 | 4.0 | 5.0 | 6.25 | 8.0 |

TABLE 3

Proportions by weight of cement for different surfactant to CNTs ratios

| | | | | | | |
|---|---|---|---|---|---|---|
| SFC/CNTs | 0.0 | 1.5 | 3.0 | 4.0 | 5.0 | 6.25 | 8.0 |
| Surfactant (wt % of cement) | 0.00 | 0.12 | 0.32 | 0.32 | 0.4 | 0.5 | 0.63 |
| MWCNTs (wt % of cement) | 0.08 | 0.08 | 0.08 | 0.08 | 0.08 | 0.08 | 0.08 |

Results and Discussion

Figure 4:
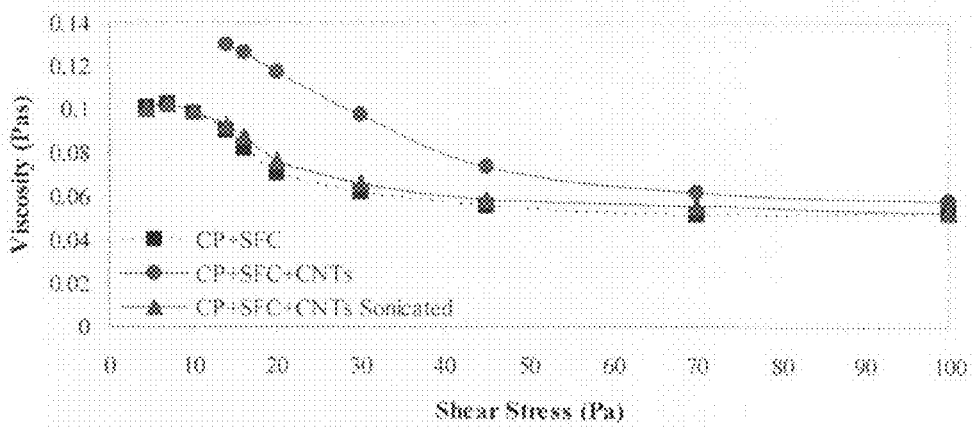
FIG. 4 is a graph illustrating the steady shear viscosity of cementitious nanocomposites (w/c=0.5) reinforced with long MWCNTs with a surfactant to CNTs ratio of 6.25. Dispersions of CNTs were treated with (CP+SFC+CNTs sonicated) and without (CP+SFC+CNTs) the use of ultrasonic energy (CP is cement paste and SFC is surfactant). The results are compared to the plain cement paste containing the same amount of surfactant (CP+SFC).

FIG. 4 shows the behavior of cementitious nanocomposites (w/c=0.5) reinforced with MWCNTs with a surfactant to CNTs ratio of 6.25. Dispersions of CNTs were treated with (CP+SFC+CNTs sonicated) and without (CP+SFC+CNTs)

the use of ultrasonic energy. The results are compared to the plain cement paste containing the same amount of surfactant (CP+SFC). All samples exhibit the typical shear thinning response of cement paste. At low shear stress the viscosity is high while at high shear stress (>70 Pa) the viscosity is decreasing and reaches a "plateau" region in which the fluid seems to have a constant viscosity. It is observed that the dispersions without sonication exhibit viscosity at low stress (14 Pa) of up to 0.13 Pa·s while the sonicated dispersions exhibit viscosity of 0.09 Pa·s which is very close to the viscosity of plain cement paste (0.07 Pa·s). As expected, at low stress conditions the application of ultrasonic energy controls the dispersion of the CNTs. Under high shear stress (>70 Pa) the agglomerates can be broken down by the fluid motions so the viscosities of the suspensions with and without sonication are similar. Analogous results (shown in Table 4) were obtained with a surfactant to CNTs ratio of 1.5, 4.0 and 5.0. Based on the results it can be concluded that for proper dispersion the application of ultrasonic energy is required to effectively disperse CNTs under the conditions used in Examples 1 to 5.

TABLE 4

Viscosities (Pas) at low shear stress condition (<14 Pa) of cement paste (w/c = 0.5) reinforced with CNTs

| Surfactant | CNTs weight ratio | | |
|---|---|---|---|
| | 1.5 | 4.0 | 5.0 |
| CP + SFC | 0.86 | 0.27 | 0.20 |
| CP + SFC + CNTs | 0.94 | 0.39 | 0.26 |
| CP + SFC + CNTs sonicated | 0.89 | 0.29 | 0.20 |

Example 2

Surfactant Concentration Effect

Figure 5A:
FIGS. 5($a$) through 5($d$) depict SEM images of cement paste reinforced with long MWCNTs dispersed at different surfactant to CNTs ratios, wherein FIGS. (a)-(d) represent a surfactant to CNTs weight ratio of 0, 1.5, 4.0 and 6.25, respectively.
Figure 5B:
Figure 5C:
Figure 5:
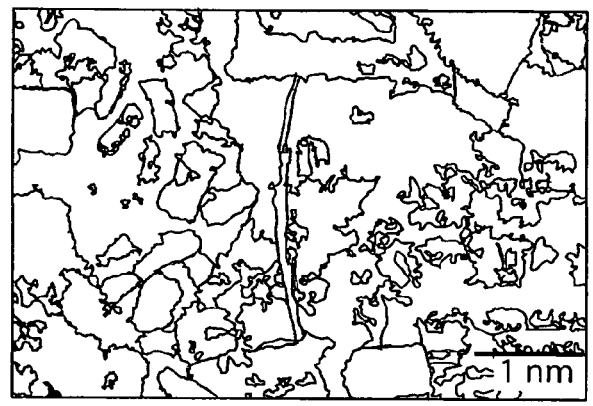

The present example involves determining an optimum surfactant/CNTs ratio in an attempt to achieve effective dispersion of CNTs in the cement matrix. In order to investigate the surfactant concentration effect on the dispersion of the carbon nanotubes, nanoimaging of the fracture surfaces and fracture mechanics tests of samples with surfactant to CNTs weight ratios of 0, 1.5, 4.0, 5.0, 6.25 and 8.0 were performed. Cement paste samples (w/c=0.5) reinforced with 0.08 wt % CNTs treated with different amounts of surfactant were prepared following the protocol and the mix proportions described in Example 1.
Results and Discussion Results from SEM images at a 1 μm scale are presented in FIGS. 5(a) and (b). As expected, in the samples where dispersion was achieved without the use of surfactant [FIG. 5(a)], CNTs appear poorly dispersed in cement paste, forming large agglomerates and bundles. In the case where dispersion was achieved with a surfactant to CNTs ratio of 1.5 [FIG. 5(b)], it is observed that CNTs mainly remain as large agglomerates entangled in the cement paste hydration products. In that case, only a small amount of CNTs was dispersed. In samples where the surfactant to CNTs ratio lies within the range from 4.0 to 6.25 [FIG. 5(c)-5(d)], only individual CNTs were identified on the fracture surface.

Figure 6:
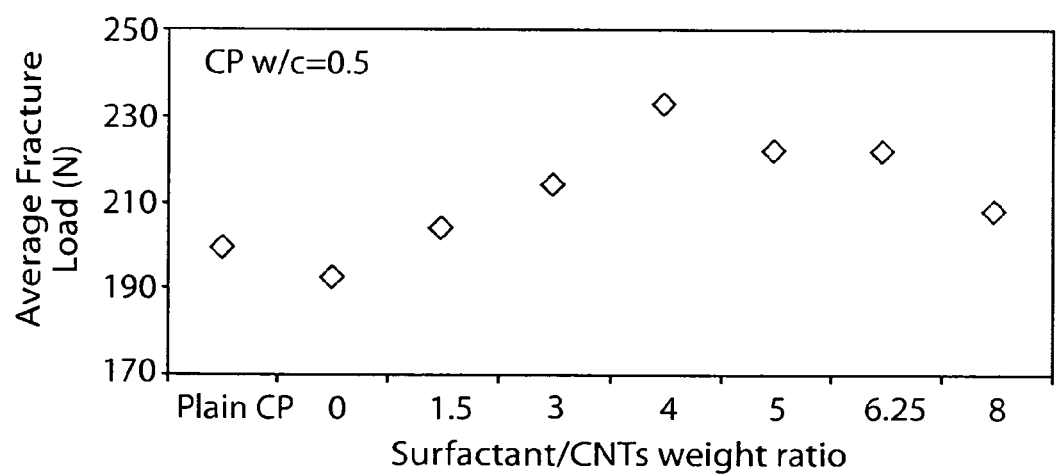
FIG. 6 is a graph illustrating the average fracture load of 28 days w/c=0.5 cement paste reinforced with short MWCNTs at an amount of 0.08 wt % by weight of cement dispersed at different surfactant to CNTs weight ratios.

The fracture mechanics test results of the maximum load for cement paste samples containing CNTs with different surfactant to CNTs weight ratio for 28 days are plotted in FIG. 6. It is observed that samples treated with different amounts of surfactant exhibit higher fracture load than plain cement paste. One the other hand, samples where dispersion was achieved without the use of surfactant exhibit lower fracture load. This decrease in strength indicates that CNTs are poorly dispersed in cement matrix and that the use of surfactant is absolutely required in order to achieve proper dispersion. The samples with surfactant to CNT weight ratio of 4.0 give a higher average fracture load increase at all ages. Specimens where dispersion was achieved at surfactant to CNTs weight ratios either lower or higher than 4.0 exhibit lower fracture load. A possible explanation could be that at lower surfactant to CNT weight ratios, less surfactant molecules are absorbed to the carbon surface and the protection from agglomeration is reduced. At higher surfactant to CNT weight ratios, bridging flocculation can occur between the surfactant molecules. Too large amount of surfactant in the aqueous solution is causing the reduction of the electrostatic repulsion forces between the CNTs (Junrong et al., Carbon 2007, 45, 618-623). The results indicate that for effective dispersion, under the particular conditions used in Examples 1 to 5, there exists an optimum weight ratio of surfactant to CNTs close to 4.0.

Example 3

Effect of Ultrasonic Energy

This example serves to illustrate the effect of ultrasonic energy on the dispersion of short and long CNTs. To investigate the effect of ultrasonic energy on the dispersion of short carbon nanotubes, fracture mechanics tests of samples reinforced with CNTs dispersed using energy of 700, 1400, 2100, 2800 and 3500 kJ/l were performed. To study the effect of ultrasonic energy on the dispersion of long CNTs fracture mechanics tests of samples reinforced with long CNTs dispersed using energy of 2800 and 4200 kJ/l were conducted. Additional experiments were performed to determine the effect of presonication on the dispersion of long CNTs.
Samples Preparation In order to investigate the effect of ultrasonic energy on the dispersion of short MWCNTs, five dispersions were prepared, at a surfactant to CNTs ratio of 4.0, by adding 0.26 g of short MWCNT to 100 g of aqueous surfactant solution containing 1.04 g of Glenium 3030. The resulting dispersions were sonicated at room temperature at the energy of 700, 1400, 2100, 2800 and 3500 kJ/l following the procedure described previously. Cement paste samples with water to cement ratio of 0.3 reinforced with 0.08 wt % CNTs were prepared. A water to cement ratio of 0.3 was used as the results of the fracture mechanics tests were found to be more consistent for cement paste samples with lower water to cement ratio probably due to the denser microstructure of the paste.

To study the effect of ultrasonic energy on the dispersion of long MWCNTs, dispersions at a surfactant to CNTs ratio of 4.0 were prepared by adding 0.26 g of long MWCNT at an aqueous surfactant solution (100 g) containing 1.04 g of Glenium 3030. The resulting dispersions were sonicated at room temperature at the energy of 2800 and 4200 kJ/l. Cement paste samples with water to cement ratio of 0.3 reinforced with 0.08 wt % CNTs were prepared.

In order to investigate the effect of presonication on the dispersion of long MWCNTs, dispersions were prepared by adding 0.16 g of long MWCNT in 99.21 g of water. The resulting dispersions were pre-sonicated at room temperature at an energy of 400 kJ/l following the typical sonication procedure described previously. After pre-sonication, 0.63 g of Glenium 3030 were added to the dispersions at a surfactant to CNTs weight ratio of 4.0. The resulting dispersions were sonicated at room temperature at the energy of 2800 kJ/l. Cement paste samples with water to cement ratio of 0.5 reinforced with 0.08 wt % CNTs were prepared.

Results and Discussion

Figure 7:
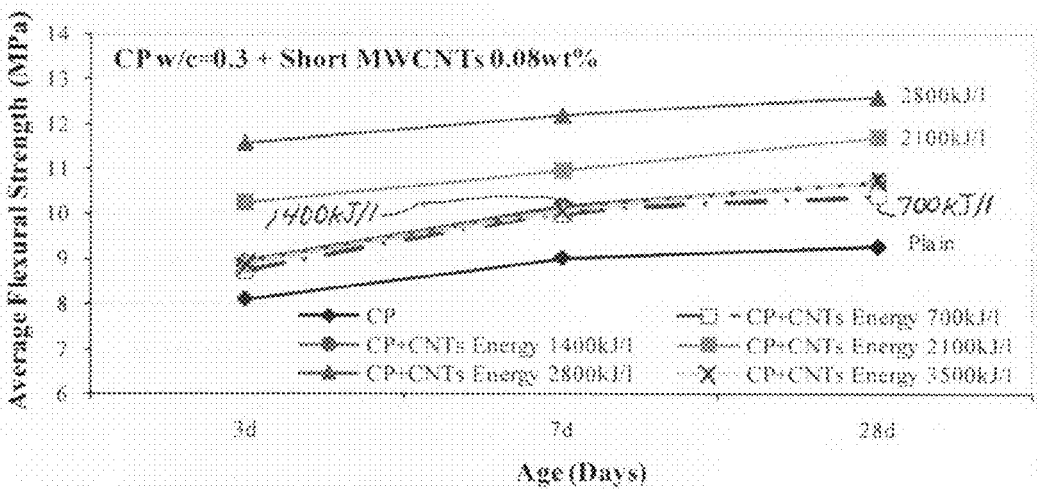
FIGS. 7($a$) and 7($b$) illustrate the fracture mechanics test results wherein FIG. 7($a$) shows the flexural strength and FIG. 7($b$) shows the Young's modulus of w/c=0.3 cement paste reinforced with short MWCNTs at an amount of 0.08 wt % by weight of cement dispersed using different ultrasonic energies.
Figure 7:
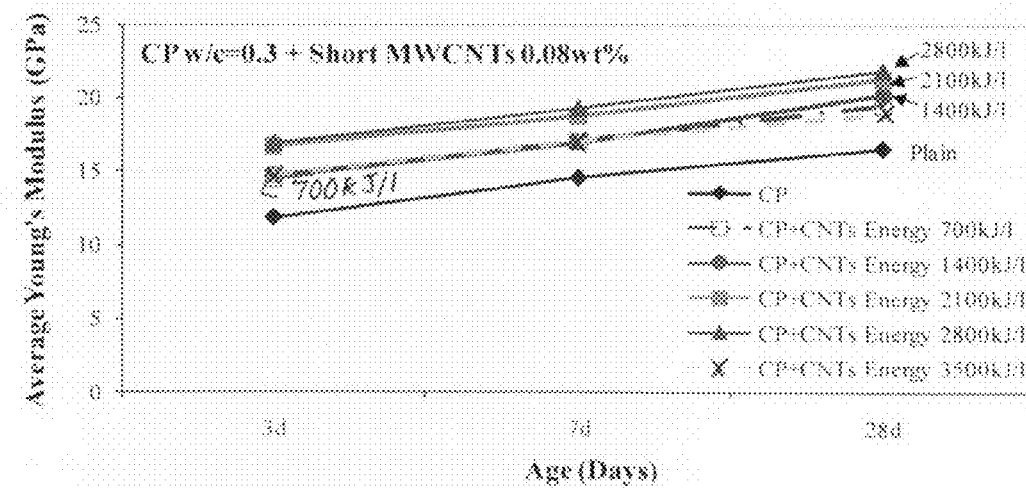

The fracture mechanics test results of the flexural strength and the Young's modulus of cement paste samples reinforced with short CNTs at an amount of 0.08 wt % dispersed using different dispersing energies, at the age of 3, 7 and 28 days, are plotted in FIGS. 7(a) and (b), respectively. In all cases, the samples reinforced with CNTs exhibit higher flexural strength of at least 8% and Young's modulus of at least 15% than those of plain cement paste. Samples dispersed at an ultrasonic energy of 2800 kJ/l illustrate the best mechanical performance at all ages. Samples dispersed with energies either lower or higher than 2800 kJ/l give specimens with less flexural strength increase. Generally, sonication energy has two effects on nanotube dispersions, it mechanically disentangles nanotube agglomerates while simultaneously breaks the individual nanotubes so that their aspect ratios are reduced (Yang et al., J. Appl. Phys. 2006, 99, 114307). Based on the results it can be concluded that at lower sonication energies adequate dispersion can not be achieved while at higher sonication energies the aspect ratio of the tubes is reduced resulting to less effective load transfer. The results suggest that for complete dispersion, under the conditions used in Examples 1 to 5, an ultrasonic energy close to 2800 kJ/l should be applied.

Figure 8:
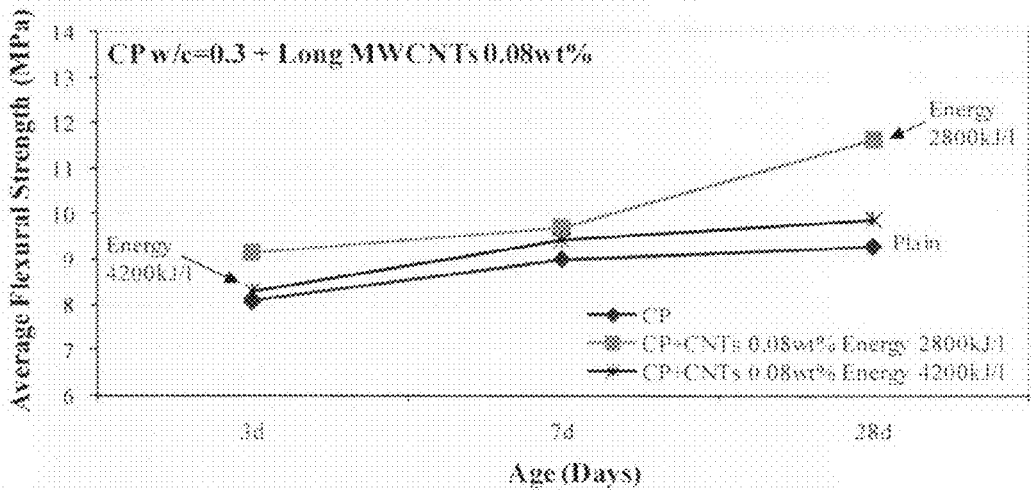
FIG. 8 is a graph illustrating the flexural strength of w/c=0.3 cement paste reinforced with long MWCNTs at an amount of 0.08 wt % by weight of cement dispersed using ultrasonic energies of 2800 and 4200 kJ/l.

Similar results are obtained with long CNTs. FIG. 8 shows the flexural strength results of specimens reinforced with long CNTs dispersed with energies of 2800 and 4200 kJ/l. It is observed that extra sonication energy does not result in effective reinforcement.

Figure 9:
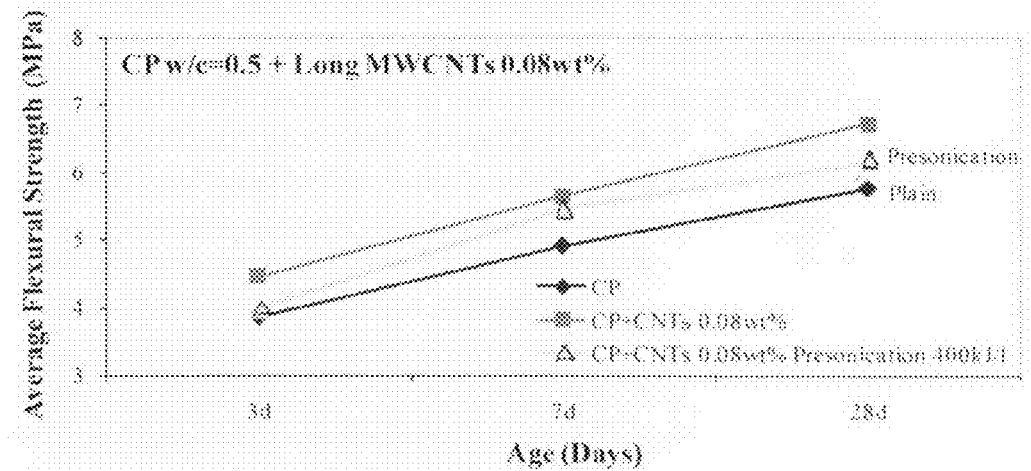
FIG. 9 is a graph illustrating the flexural strength of w/c=0.5 cement paste reinforced with long MWCNTs at an amount of 0.08 wt % dispersed with and without presonication.

Additional experiments were performed to investigate the effect of the presonication on the dispersion of long CNTs. The flexural strength results of cement paste samples dispersed with and without presonication are plotted in FIG. 9. It is observed that the samples dispersed with the use of presonication exhibit lower strength increase. A possible explanation could be that with the presonication additional energy is being added to the dispersions resulting into the breaking of the CNTs and the reduction of the mechanical performance of the nanocomposites.

Example 4

Effect of Surfactant Type

In order to investigate the effect of surfactant type on the dispersion of the carbon nanotubes, fracture mechanics tests of samples reinforced with CNTs dispersed using different types of polycarboxylate based superplasticizers and one type of naphthalene based superplasticizer were performed.

Samples Preparation

The work described in this Example was performed using short MWCNTs supplied by Cheap tubes. Five dispersions were prepared by mixing the MWCNT (0.26 g) with aqueous surfactant solutions (100 g) at a surfactant to CNTs weight ratio of 4.0. Four different commercially available polycarboxylate based superplasticizers and one naphthalene sulfonate based superplasticizer were used to investigate the effect of different type of surfactants on the dispersion of CNTs. The characteristics of the superplasticizers are shown in Table 5. The resulting dispersions were sonicated at room temperature at an energy of 2800 kJ/l following the procedure described previously. Cement paste samples with water to cement ratio of 0.3 reinforced with 0.08 wt % CNTs treated with different types of surfactant were prepared following the mixing protocol described previously.

TABLE 5

Characteristics of the superplasticizers

| Name | Company | Type | Dosage (% by weight of cement) |
|---|---|---|---|
| Glenium 3030 | BASF | Polycarboxylate | 0.10-0.64 |
| Adva 360 | GRACE | Polycarboxylate | 0.32 |
| Adva Cast 555 | GRACE | Polycarboxylate | 0.32 |
| PS 1466 | BASF | Polycarboxylate | 0.32 |
| Daracem 19 | GRACE | Naphthalene Sulfonate | 0.32 |

Results and Discussion

Figure 10:
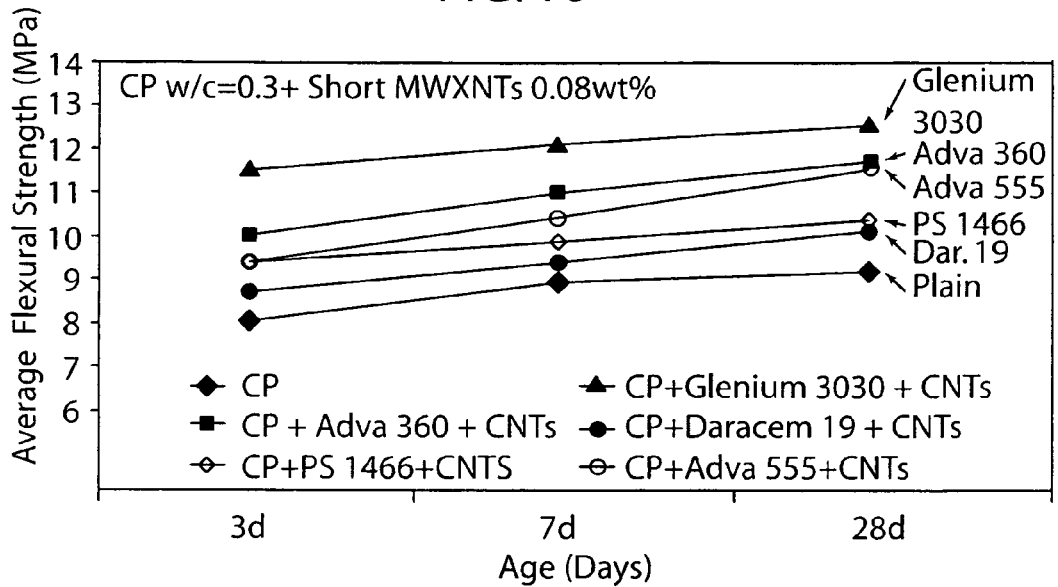
FIG. 10 illustrates the fracture mechanics test results of the flexural strength w/c=0.3 cement paste reinforced with short MWCNTs at an amount of 0.08 wt % by weight of cement dispersed using different types of surfactant.

FIG. 10 demonstrates the fracture mechanics test results of the flexural strength of cement paste samples reinforced with short CNTs at an amount of 0.08 wt % dispersed using different types of surfactant, at the age of 3, 7 and 28 days. In all cases, the samples reinforced with CNTs exhibit higher flexural strength of at least 8% than that of plain cement paste. More specifically, samples dispersed using the naphthalene sulfonate based superplasticizer, Daracem 19, exhibit lower flexural strength increase. This low strength increase may be attributed to the dispersion mechanism of naphthalene-based products which differ from the polycarboxylate based superplasticizers. Naphthalene-based superplasticizers, which are a typical representative of the second generation superplasticizers, disperse cement particles using electrostatic repulsion instead of steric hidrance mechanism. This form of dispersion is less powerful in its effect and provides less workability to the cementitious mix than the polycarboxylate superplasticizers (Bjornstrom and Chandra, Materials and Structures 2003, 36, 685-692). Comparing the response of the samples dispersed with different type of polycarboxylate based superplasticizers, which represent the third generation of superplasticizers, it is observed that the samples dispersed using Glenium 3030 exhibit higher strength increase close to 40%. Specimens dispersed with Adva 360, Adva Cast 555 and PS 1466 demonstrate slightly lower strength. This response may be associated with differences in the chemical composition of the superplasticizers. In general, polycarboxylate based superplasticizers with longer polyoxyethylene side chains, lower degree of backbone polymerization and higher contents of sulfonic groups exhibit higher dispersing effect (Yamada et al., Cem. Concr. Res. 2000, 30, 197-207; Felekoglu and Sarikaya, Constr. Build. Mater. 2008, 22, 1972-1980). The results indicate that for proper dispersion a polycarboxylate based superplasticizer can be used as a surfactant. In particular, for a surfactant to CNTs ratio of 4, under the test conditions employed in this Example or Examples 1 to 5, in order to achieve effective dispersion the Glenium 3030 should be employed.

Example 5

Effect of CNTs Type and Concentration

This example serves to illustrate the reinforcing effect of CNTs by examining the effects of CNTs aspect ratio and concentration on the nano- and macro mechanical properties of cement paste. To investigate the effect of CNTs aspect ratio and concentration, nanoimaging, fracture mechanics tests and nanoindentation tests of cement paste samples (w/c=0.3 and 0.5) reinforced with short and long CNTs at different concentrations were performed. Also, the effect of CNTs on the autogenous shrinkage was studied.

Materials

Long and short MWCNTs were used. The surfactant used was a full range water reducing admixture (superplasticizer) based on polycarboxylate chemistry (Glenium 3030) produced by BASF.

Samples Preparation

Five mix proportions for the sonicated suspensions were investigated. For all the mixes the surfactant to CNTs weight ratio was 4.0. The mix proportions for the sonicated suspensions are shown in Table 6. The resulting dispersions were sonicated at room temperature at an energy of 2800 kJ/l following the procedure described previously. Then the dispersions were mixed with cement at a water to cement ratio of 0.5 and 0.3. The mix proportions by weight of cement for water to cement ratios of 0.5 and 0.3 are shown in Table 7 and Table 8, respectively. Note that the amount of CNTs by weight of cement differs according to the water to cement ratio used. For example, the third sonicated mix (mix 3), for which dispersion appears very good, at a water to cement ratio of 0.5 produces specimens with 0.08 wt % of cement CNTs while at a water to cement ratio of 0.3 produces specimens with 0.048 wt % of cement CNTs.

TABLE 6

Mix proportions for sonicated suspensions

|  | Mix 1 | Mix 2 | Mix 3 | Mix 4 | Mix 5 |
|---|---|---|---|---|---|
| Water (wt %) | 99.75 | 99.52 | 99.21 | 99.68 | 98.36 |
| Surfactant (SFC) (wt %) | 0.20 | 0.38 | 0.63 | 1.05 | 1.31 |
| MWCNTs (wt %) | 0.05 | 0.10 | 0.16 | 0.26 | 0.33 |

TABLE 7

Mix proportions for nanocomposites with water to cement ratio of 0.5 (w/c = 0.5)

| Sonicated mixes: | Mix 1 | Mix 2 | Mix 3 |
|---|---|---|---|
| Surfactant (SFC) (wt % of cement) | 0.10 | 0.19 | 0.32 |
| MWCNTs (wt % of cement) | 0.025 | 0.048 | 0.08 |

TABLE 8

Mix proportions for nanocomposites with water to cement ratio of 0.3 (w/c = 0.3)

| Sonicated mixes: | Mix 3 | Mix 4 | Mix 5 |
|---|---|---|---|
| Surfactant (SFC) (wt % of cement) | 0.19 | 0.32 | 0.40 |
| MWCNTs (wt % of cement) | 0.048 | 0.08 | 0.10 |

Results and Discussion

Figure 11A:
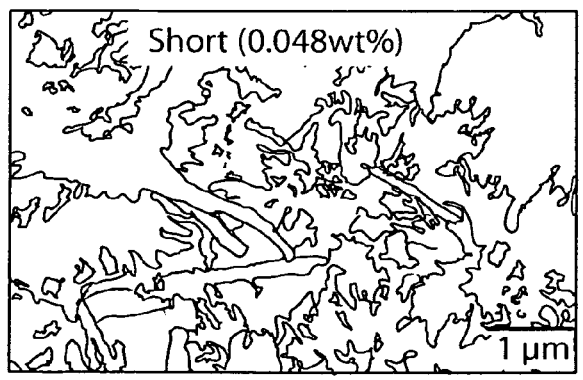
FIGS. 11($a$) through 11($d$), depict SEM images of cement paste reinforced with long and short MWCNTs with concentrations of FIG. 12($a$) 0.048 wt % and FIG. 12($b$) 0.08 wt % for short MWCNTs and FIG. 12($c$) 0.048 wt % and FIG. 12($d$) 0.08 wt % for long MWCNTs.
Figure 11:
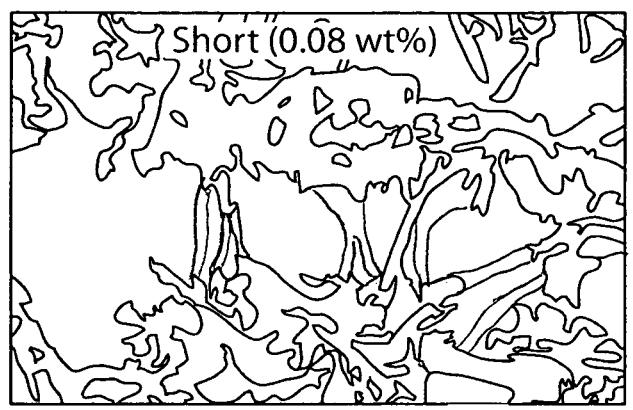
Figure 11:
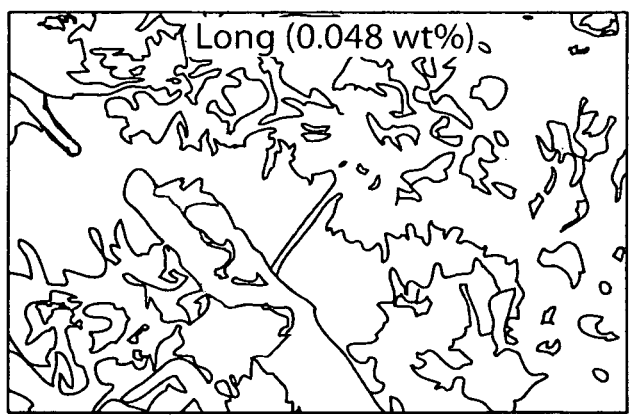
Figure 11:
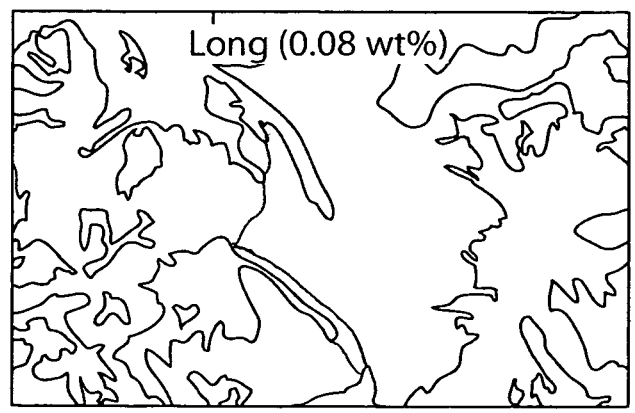

The effect of the addition of short and long CNTs on the dispersion and the nanostructure of cement nanocomposites with water to cement ratio of 0.5 is shown in FIGS. 11(a) through 11(d). The figure shows SEM images of the fracture surface of the samples reinforced with short and long CNTs at two different concentrations at a scale of 1 μm. It can be observed that in all cases CNTs are well dispersed in cement paste and only individual CNTs can be identified on the fracture surface. Moreover, it is observed that CNTs are wrapped by the hydration products indicating that good bonding between the carbon nanotubes and cement matrix is achieved. More importantly, FIGS. 11(a) and 11(b) illustrate that CNTs bridge the nanocracks and pores. This indicates that the addition of small quantity of well dispersed CNTs can enable the control of the matrix cracks at the nanoscale level.

Figure 12:
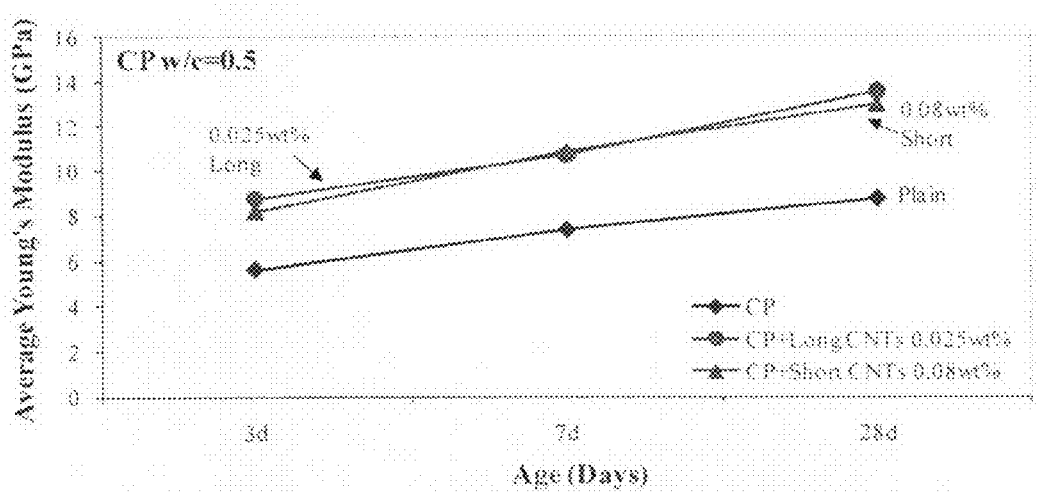
FIGS. 12($a$) and 12($b$) illustrate the fracture mechanics test results of the Young's modulus of cement paste nanocomposites with water to cement ratio of FIG. 12($a$) w/c=0.5 and FIG. 12($b$) w/c=0.3. The nanocomposites shown exhibit the best mechanical performance among the different mixes tested.
Figure 12:
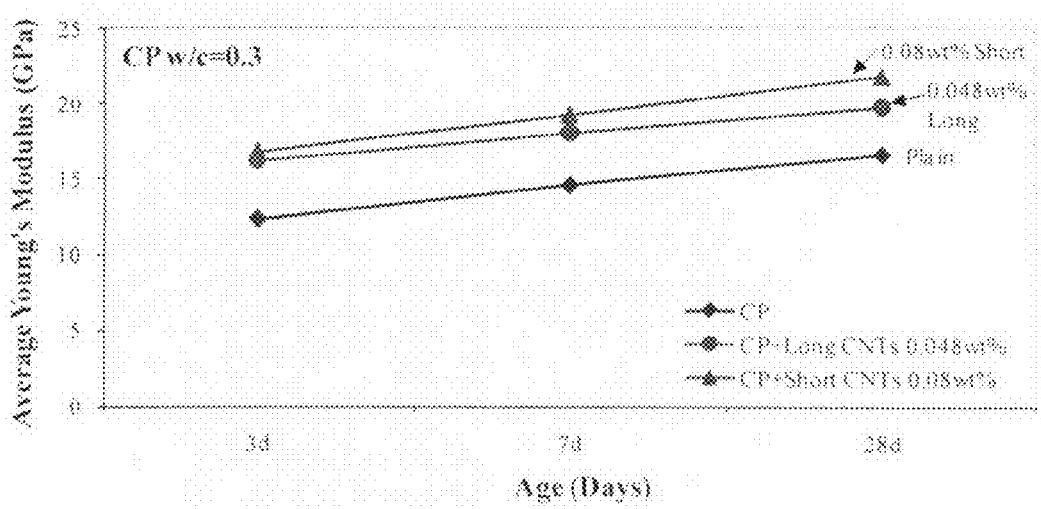

To investigate the reinforcement effect of CNTs fracture mechanics tests were conducted on cement paste samples reinforced with 0.048 wt %, 0.08 wt % and 0.10 wt % of cement short CNTs and with 0.025 wt %, 0.048 wt % and 0.08 wt % of cement long CNTs. The fracture mechanics test results of the average Young's modulus of the nanocomposites which demonstrated the best mechanical performance for water to cement ratios of 0.5 and 0.3 are illustrated in FIGS. 12(a) and (b), respectively. It is noticed that, specimens with water to cement ratio of 0.5 reinforced with either short CNTs at an amount of 0.08 wt % or long CNTs at an amount of 0.025 wt % provide the same level of mechanical performance. While, specimens with water to cement ratio of 0.3 reinforced with short CNTs at an amount of 0.08 wt % provide slightly better mechanical performance than specimens reinforced with 0.048 wt % long CNTs. Generally, it can be concluded that the optimum amount of CNTs depends on the aspect ratio of CNTs. When short CNTs are used with low aspect ratio a higher amount close to 0.08 wt % by weight of cement is needed to achieve effective reinforcement. However, when long CNTs are used with higher aspect ratio less amount of CNTs close to 0.048 wt % or even lower (0.025 wt %) is needed to achieve the same level of mechanical performance. These differences in the reinforcing effect of nanotubes are attributed to the aspect ratio (length) of CNTs which pays an important role in the dispersion of CNTs and the reinforcement of cementitious materials. Short CNTs are easier to disperse however, due to their length, higher concentration in the cement paste matrix is needed to reduce the fiber free area of the material and arrest the nanocracks. Conversely, long CNTs are more difficult to disperse and adequate dispersion can be achieved with lower amounts. Effective dispersion of the long CNTs in the cement matrix results in an increase in the mechanical performance of the nanocomposite. (It must be noted that there is an optimum amount of short CNTs close to 0.08 wt % by weight of cement. Specimens with higher concentrations have illustrated less improvement in the mechanical properties probably due to poor dispersion.)

Comparing the Young's modulus of the nanocomposites with that of the plain cement paste with water to cement ratio of 0.5 at the age of 28 days, an increase of at least 25% and near 55% in the Young's modulus is observed. Based on the parallel model (Mindess et al., Prentice Hall, Upper Saddle River, 2003) the predicted Young's modulus of cement paste nanocomposite reinforced with 0.025 wt % long CNTs at the age of 28 days is 9.0 GPa. It is observed that the predicted modulus is much lower than the experimental value of 13.5 GPa. An evaluation study of the Young's modulus of concrete nanocomposites reinforced with 1% CNTs predicts a 33% increase (Rouainia et al., J. Eng. & Appl. Sci. 2008, 504-515), which is lower than the increase obtained in this study. To further investigate the increase of the Young's modulus, nanoindentation tests were performed.

Figure 13:
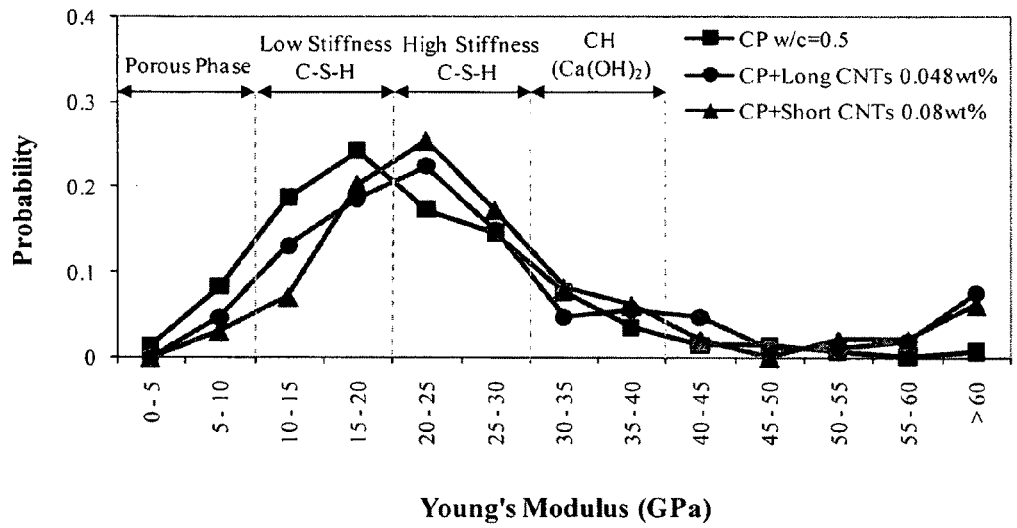
FIG. 13 illustrates the probability plot of the calculated Young's modulus of 28 days cement paste (w/c=0.5), cement paste reinforced with 0.048 wt % long CNTs and cement paste reinforced with 0.08 wt % short CNTs.

In order to investigate the effect of CNTs on the nanomechanical properties of the cementitious nanocomposites, nanoindentation tests were performed on 28 days cement paste samples reinforced with CNTs. FIG. 13 shows the probability plot of the Young's modulus of plain cement paste (w/c=0.5), cement paste reinforced with 0.08 wt % short CNTs and cement paste reinforced with 0.048 wt % long CNTs. Similar experiments, on plain cement specimens using the same type of cement and testing procedure, were carried out by Mondal (PhD thesis, available from the library of Northwestern University December 2008) on 28 days cement paste specimens (w/c=0.5). A peak analyzing protocol was used by Mondal to fit four normal distributions to the probability plot of the Young's modulus corresponding to the porous phase, low stiffness C-S-H, high stiffness C-S-H and calcium hydroxide. The same analyzing protocol was used by Constantinides and Ulm (J. Mech. Phys. Solids 2007, 55, 64-90) on the nanoindentation results of 5 months white cement paste specimens (w/c=0.5). The probability plot of Young's modulus of plain cement paste is in agreement with the probability plot of Mondal and the frequency plot of Constantinides and Ulm. However, while the peak of the distribution of the nanoindentation modulus of the plain cement paste falls in the area of 15 to 20 GPa and represents the low stiffness C-S-H, the peak of the probability plot of the Young's modulus of the CNTs nanocomposites were found to be in the area of 20 to 25 GPa which represents the high stiffness C-S-H gel. These results suggest that the incorporation of CNTs increased the amount of high stiffness C-S-H gel resulting in a stronger material. Furthermore, the area between 0 to 15 GPa is attributed to a material region for which the indentation response is dominated by high porosity. Comparing the probability plots of the Young's modulus of the CNTs nanocomposites with the probability plot of plain cement paste it is observed that the probability of Young's modulus below 10 GPa is reduced for the samples with CNTs. These results suggest that CNTs reduce the nanoporosity of cement paste by filling the gaps between the C-S-H gel. This result also agrees well with the experimental results of SEM images where it is observed that CNTs bridge the nanocracks and pores, FIGS. 11(a)-11(d). The reduction of the porosity and the increase of the high stiffness S-C-H indicate that the addition of CNTs enables the control of the nanocracks and creates a "crack free" material. Additionally, comparing the probability plots of the Young's modulus of the CNTs nanocomposites it is observed that the probability of high-stiffness C-S-H is higher for the samples with short CNTs and lower for the samples with long CNTs. This indicates that the samples reinforced with 0.08 wt % short CNTs exhibit more improved properties at the nanoscale than the samples reinforced with 0.048 wt % long CNTs. This response comes into agreement with the macromechanical properties of the samples where the samples with 0.08 wt % short CNTs exhibit slightly higher Young's modulus than the samples reinforced with 0.048 wt % long CNTs.

Based on the nanoindentation results it can be concluded that CNTs change the nanostructure of cement paste by increasing the amount of high stiffness C-S-H and decreasing the porosity. Typically, changes in the nanostructure significantly affect the transport properties (properties that are related with the movement of the water in the pores) besides the fracture properties of cementitious materials. One particular property that it is influenced by the nanostructure is the autogenous shrinkage. Recently, it has been increasingly recognized that high strength and high performance concrete is sensitive to the microcracking that occurs at early ages as the result of the volumetric changes due to the high autogenous shrinkage (Konsta-Gdoutos et al., International Symposia Celebrating Concrete, Dundee, Scotland, 2003). A possible solution to this problem is to provide embedded source of water by the addition of saturated lightweight fine aggregates or polymers.

Figure 14:
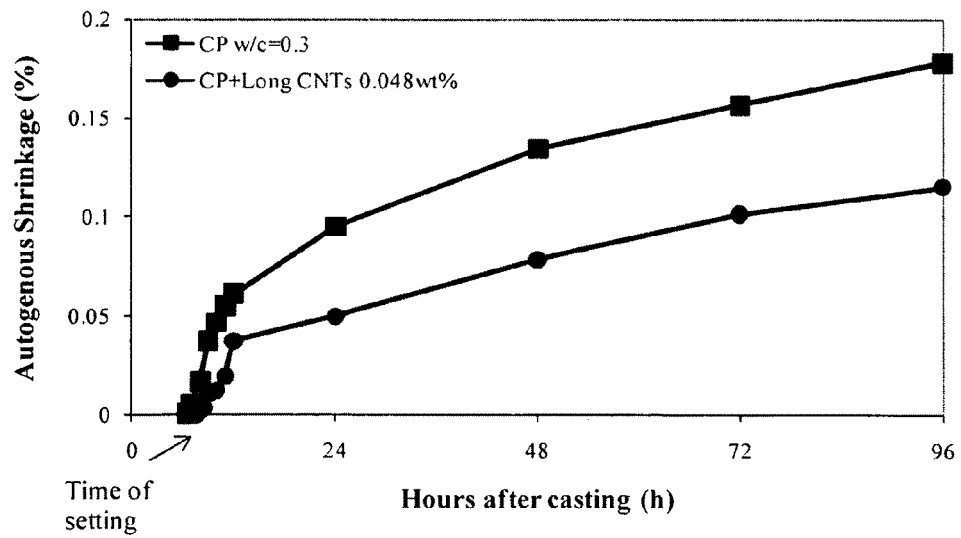
FIG. 14 illustrates the autogenous shrinkage results of cement paste (w/c=0.3) and cement paste reinforced with 0.048 wt % long CNTs.

To investigate the effect of CNTs on the autogenous shrinkage experiments were conducted on cement paste samples with water to cement ratio of 0.3. FIG. 14 shows the autogenous shrinkage results of plain cement paste and cement paste reinforced with 0.048% by weight of cement long CNTs. The results suggest that the incorporation of CNTs has lead to a substantial reduction of the autogenous shrinkage, at least 30% and near 40%. Results indicate that CNTs provide a unique role in cement based materials, not only they improve the mechanical performance but also they improve the transport properties producing a high performance nanocomposite.

Figure 15:
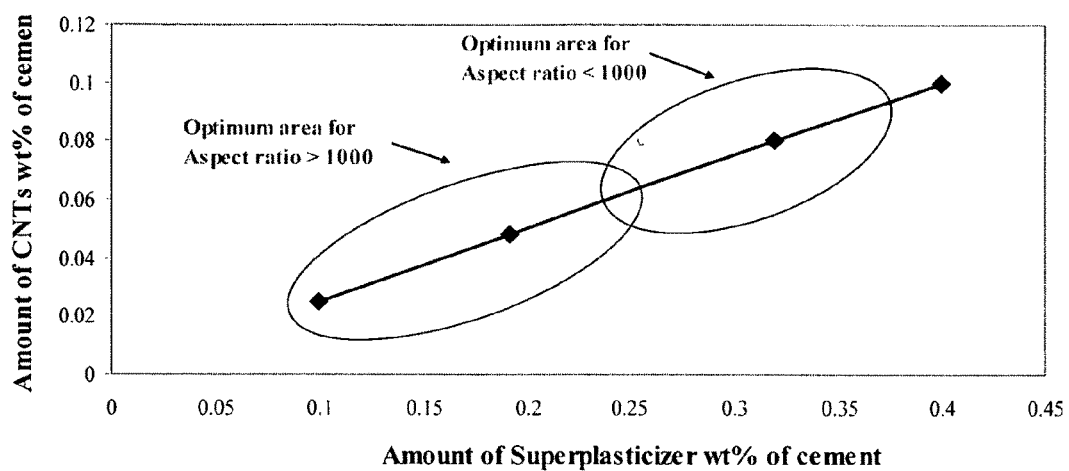
FIG. 15 illustrates the optimum amount of MWCNTs and superplasticizer according to the aspect ratio of CNTs for reinforcement in cement based materials.

The present invention provides a practical method for dispersing multi-wall carbon nanotubes for reinforcement in cementitious materials. Effective dispersion was achieved by applying ultrasonic energy with the use of a polycarboxylate based superplasticizer as a surfactant to make the dispersion. Desirable dispersion is achieved using the application of ultrasonic energy and the use of surfactant in a manner described above. In addition, results have shown that for complete dispersion, there is an optimum combination of the surfactant to CNTs ratio used and the ultrasonic energy applied. In particular, it was found that for complete dispersion, regardless the length of the CNTs, a surfactant to carbon nanotubes ratio of about 4.0 and an ultrasonic energy of about 2800 kJ/l should be used. Investigating the effect of different types of surfactants it was found that polycarboxylate based superplasticizers provide better dispersion than naphthalene based ones. Particularly, complete dispersion can be achieved when Glenium 3030 is used. Investigating the reinforcing effect of CNTs it was found that the fracture properties of cement matrix can be substantially increased through proper dispersion of small amounts of CNTs (0.03 wt % to 0.10 wt %). In particular, the effect of aspect ratio of CNTs have shown that when short CNTs are used, higher amounts of CNTs (0.08 wt %) are required to achieve effective reinforcement, while when longer CNTs are incorporated, lower amounts of CNTs (0.03 wt % to 0.04 wt %) are needed to achieve the same level of mechanical performance. Particular optimum amounts of CNTs and superplasticizer according to the aspect ratio of CNTs for reinforcement in cement based materials are shown in FIG. 15. Nanoimaging of the fracture surfaces of cement nanocomposites have shown that CNTs reinforce cement paste by bridging the nanocracks and pores indicating that the addition of small quantity of well dispersed CNTs can enable the control of the matrix cracks at the nanoscale level. The nanoindentation results suggest that CNTs can modify and reinforce the cement paste matrix at the nanoscale by increasing the amount of high stiffness C-S-H and decreasing the porosity which leads to the reduction of the autogenous shrinkage. The autogenous shrinkage results indicate that CNTs, in addition to providing the reinforcing effect, can also have beneficial effect on other properties such as the transport properties of cementitious materials. The present invention thereby provides a nanocomposite cementitious material that exhibits a reduced autogenous shrinkage as compared to the same cementitious material without carbon nanotubes. For example, the present invention provides a nanocomposite cementitious material that exhibits a reduction of autogenous shrinkage of at least 30% and up to about 40% after 96 hours from casting as compared to the same cementitious material without carbon nanotubes. The nanocomposite cementitious material according to an embodiment of the invention exhibits a modified nanostructure so that the average values of stiffness and hardness of C-S-H, as determined by nanoindentation tests, are higher compared to the same cementitious material without carbon nanotubes.

Further, the present invention provides a nanocomposite cementitious material that exhibits increased Young's modulus as compared to the same cementitious material without carbon nanotubes. For example, the nanocomposite cementitious material exhibits an increase of the Young's modulus of at least 15% and up to about 55% as compared to the same cementitious material without carbon nanotubes. Similarly, the present invention provides a nanocomposite cementitious material that exhibits increased flexural strength as compared to the same cementitious material without carbon nanotubes. For example, the nanocomposite cementitious material exhibits an increase in flexural strength of at least of 8% and up to about 40% as compared to the same cementitious material without carbon nanotubes.

Although the invention has been described in detail above in connection with certain illustrative embodiments, those skilled in the art will appreciate that changes, modifications, and the like can be made in the embodiments without departing from the spirit and scope of the invention as set forth in the appended claims.

The invention claimed is:

1. A method of making a nanocomposite cementitious material, comprising sonicating an aqueous solution containing surfactant and carbon nanotubes to form a dispersion of carbon nanotubes in the solution, and mixing the dispersion of carbon nanotubes and a cement to form a nanocomposite cementitious material wherein the carbon nanotubes are present in an amount of about 0.048% to about 0.08% by weight of the cement and further wherein the nanocomposite cementitious material exhibits a modified nanostructure so that the average values of stiffness and hardness of C-S-H, as determined by nanoindentation tests, are higher compared to the same cementitious material without carbon nanotubes.

2. The method of claim 1 wherein the carbon nanotubes have lengths of about 10 to about 100 m and diameters of about 20 to about 40 nanometers.

3. The method of claim 1 wherein a weight ratio of surfactant to carbon nanotubes is about 1.5 to about 8.0.

4. The method of claim 1 wherein dispersion of the carbon nanotubes in the aqueous solution containing surfactant occurs while sonicating the solution.

5. The method of claim 4 wherein the sonicating is conducted using an ultrasonic energy of about 700 to about 4200 kJ/l.

6. The method of claim 1 wherein the dispersion and cement are mixed at a water to cement ratio (w/c) of 0.2 to 0.6.

7. The method of claim 1 wherein the carbon nanotubes are dispersed in the aqueous solution that includes surfactant comprising polycarboxylate based superplasticizer.

8. A method of making a nanocomposite cementitious material, comprising sonicating an aqueous solution containing surfactant and carbon nanotubes to form a dispersion of carbon nanotubes in the solution, and mixing the dispersion of carbon nanotubes and a cement to form a nanocomposite cementitious material wherein the carbon nanotubes are present in an amount of about 0.02% to about 0.1% by weight of the cement including the further step of curing the nanocomposite cementitious material, wherein the cured nanocomposite cementitious material has a Young's modulus that is at least 15% higher than that of the cured nanocomposite cementitious material in the absence of the carbon nanotubes at the age of 28 days and further wherein the nanocomposite cementitious material exhibits a modified nanostructure so that the average values of stiffness and hardness of C-S-H, as determined by nanoindentation tests, are higher compared to the same cementitious material without carbon nanotubes.

9. The method of claim 8 wherein the nanocomposite cementitious material exhibits reduced autogenous shrinkage as compared to the same cementitious material without carbon nanotubes.

10. The method of claim 8 wherein the nanocomposite cementitious material exhibits increased flexural strength as compared to the same cementitious material without carbon nanotubes.

11. The method of claim 1 wherein sonicating is conducted using an ultrasonic energy of about 2800 kJ/l.

12. The method of claim 8, wherein the cement is Portland cement and the carbon nanotubes are multiwalled carbon nanotubes.

13. The method of claim 12, wherein sonicating the aqueous solution comprises sonicating the aqueous solution using an ultrasonic energy in the range from 700 to 3500 kJ/l; the surfactant to carbon nanotube weight ratio in the dispersion is in the range from about 4 to about 6.25; the surfactant comprises a polycarboxylate based superplasticizer; and the dispersion and cement are mixed at a water to cement ratio (w/c) of about 0.3 to about 0.5.

14. The method of claim 8, wherein the carbon nanotubes are present in an amount of about 0.02% to about 0.08% by weight of the cement and the cured nanocomposite cementitious material has a Young's modulus that is at least 25% higher than that of the cured nanocomposite cementitious material in the absence of the carbon nanotubes at the age of 28 days.

15. The method of claim 8, wherein the carbon nanotubes are present in an amount of about 0.02% to about 0.08% by weight of the cement and the cured nanocomposite cementitious material has a Young's modulus that is at least about 55% higher than that of the cured nanocomposite cementitious material in the absence of the carbon nanotubes at the age of 28 days.

16. The method of claim 12, wherein the carbon nanotubes are present in an amount of about 0.02% to about 0.08% by weight of the cement and the cured nanocomposite cementitious material has a Young's modulus that is at least 25% higher than that of the cured nanocomposite cementitious material in the absence of the carbon nanotubes at the age of 28 days.

17. The method of claim 12, wherein the carbon nanotubes are present in an amount of about 0.02% to about 0.08% by weight of the cement and the cured nanocomposite cementitious material has a Young's modulus that is at least about 55% higher than that of the cured nanocomposite cementitious material in the absence of the carbon nanotubes at the age of 28 days.

18. The method of claim 8, wherein the carbon nanotubes in the aqueous solution have aspect ratios of greater than 1000, the carbon nanotubes are present in an amount of about 0.02% to about 0.08% by weight of the cement and the surfactant comprises a polycarboxylate based superplasticizer that is present in an amount of about 0.08 to about 0.25 by weight of the cement.

19. The method of claim 8, wherein the carbon nanotubes in the aqueous solution have aspect ratios of less than 1000, the carbon nanotubes are present in an amount of about 0.05% to about 0.1% by weight of the cement and the surfactant comprises a polycarboxylate based superplasticizer that is present in an amount of about 0.23 to about 0.38 by weight of the cement.

20. The method of claim 12, wherein the carbon nanotubes in the aqueous solution have aspect ratios of greater than 1000, the carbon nanotubes are present in an amount of about 0.02% to about 0.08% by weight of the cement and the surfactant comprises a polycarboxylate based superplasticizer that is present in an amount of about 0.08 to about 0.25 by weight of the cement.

21. The method of claim 12, wherein the carbon nanotubes in the aqueous solution have aspect ratios of less than 1000, the carbon nanotubes are present in an amount of about 0.05% to about 0.1% by weight of the cement and the surfactant comprises a polycarboxylate based superplasticizer that is present in an amount of about 0.23 to about 0.38 by weight of the cement.

\* \* \* \* \*